Nov. 23, 1965
L. H. GREEN
3,219,275
TRUCK-MOUNTED SPRAYING MECHANISM
Filed April 10, 1964
2 Sheets-Sheet 1
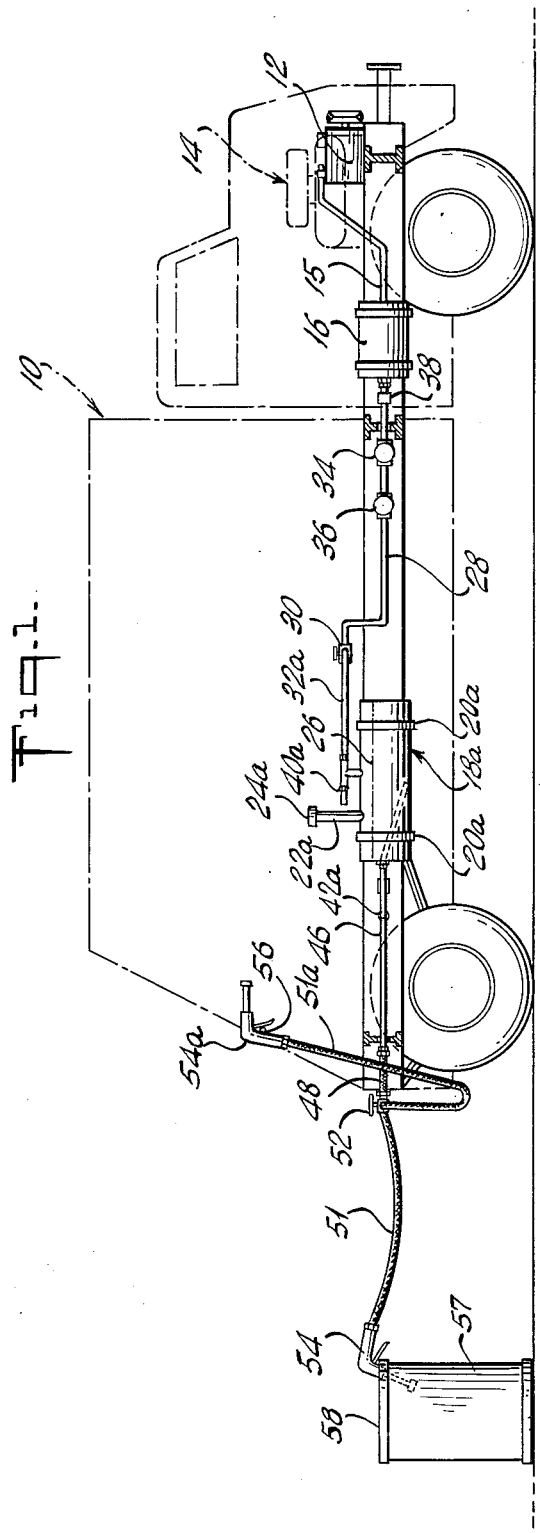
INVENTOR
LOUIS H. GREEN
BY
ATTORNEY

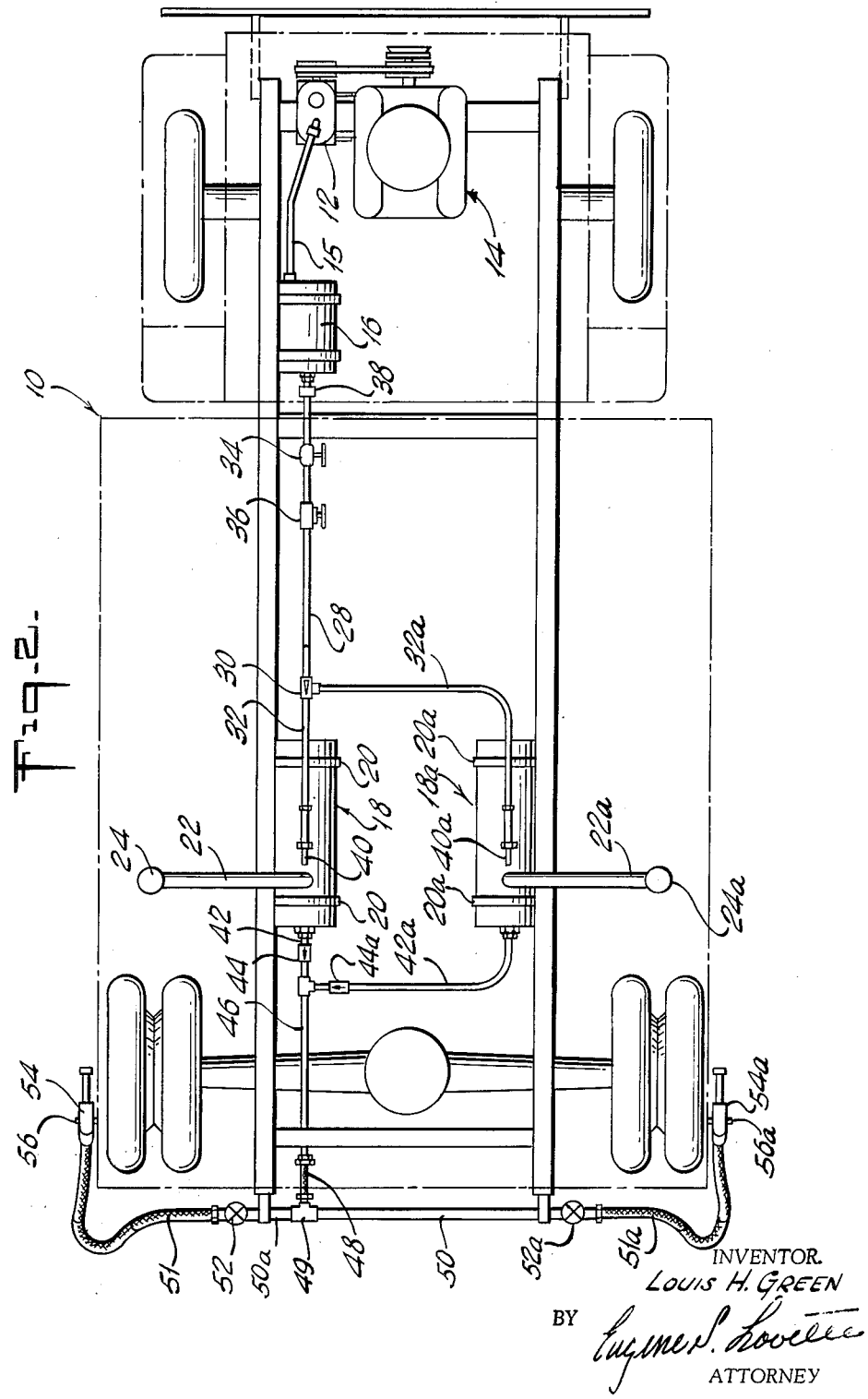

3,219,275
TRUCK-MOUNTED SPRAYING MECHANISM
Louis H. Green, 416 Clark St., Westbury,
Long Island, N.Y.
Filed Apr. 10, 1964, Ser. No. 358,851
2 Claims. (Cl. 239—172)

The present invention relates to a spraying mechanism mounted on a garbage truck or like motor vehicle for the purpose of disinfecting and deodorizing garbage cans. This system can also be used for disinfecting and deodorizing the interior of the garbage truck, trash receptacles and other containers within easy reach thereof.

Spraying systems for similar purposes are mostly self-contained and require independent compressors, motors and sometimes even power supplies. Hitherto known spraying mechanisms proved to be costly, expensive to operate, and have mostly been abandoned for these and other considerations.

It is the principal object of the present invention to provide a garbage truck-mounted spraying system which connects into and makes use of the hydraulic air brake system provided in the truck.

It is another object of the invention to provide a simple yet reliable spray operating mechanism with which garbage cans and similar receptacles may be sprayed and deodorized, preferably while the truck is in standstill position. It is thus the purpose of the invention to reduce disease and infections caused by bacteria, and in general to reduce the unpleasant effects of present-day garbage collecting methods.

According to the main feature of the invention, at least one tank is provided for a fluid disinfectant storage, whereby said tank is connected by appropriate conduit means to the compressed air storage tank of the hydraulic air brake system of the truck.

According to another feature, a pair of fluid tanks are provided in symmetrical arrangement with respect to the longitudinal truck axis so that the load of the disinfectant and of the spray mechanism is evenly distributed with respect to the truck.

According to other features, the spray conduit means may comprise valve means for selectively connecting one or the other fluid tank to the compressed air tank; pressure regulator means for reducing the pressure in the storage tanks to a predetermined safe pressure suitable for the operation of nozzle means through which the fluid disinfectant is discharged; low-pressure cutoff valve means for preventing the pressure of the storage-tank against dropping below a predetermined value required for proper operation of the air brake system; and/or relief valve means for preventing the pressure in the fluid tanks to rise above a predetermined value in excess of that required for the operation of the spray system.

Yet another feature of the invention provides control means for the nozzle means, operable upon actuation thereof by a receptacle or the like article to be sprayed, so as to relieve the operator's hands for other chores.

The safety features built into the novel spraying system will positively prevent any interference with, or harm to, the hydraulic air brake system of the truck, and, on the other hand, will assure faultless operation of the spraying mechanism at all times.

Further objects and advantages will become apparent from the following description of the invention taken in conjunction with the figures, in which:

FIG. 1 is a side elevational view with parts broken away depicting the truck-mounted spraying mechanism in accordance with the principles of the invention; and FIG. 2 is a top elevational view of same.

The figures illustrate the invention as part of a garbage removal truck 10 of the type used by municipal sanitation departments. Truck 10 is normally provided with an air compressor 12, see FIG. 2, for operating its conventional air brake system. Air compressor 12 is driven by a truck engine 14. The highly compressed air provided by compressor 12 is fed by conduit 15 to an air brake tank 16 and stored thereat.

The disinfectant and deodorizing substance to be sprayed is stored in a pair of fluid storage tanks 18, 18a. Tanks 18, 18a are secured to the truck chassis by brackets 20, 20a or similar known devices. In order to fill tanks 18, 18a with disinfectant, tanks 18, 18a have individual inlet tubes 22, 22a provided with screw-type caps 24, 24a, wherein the latter provide airtight enclosures unless removed. The level of the filled-in disinfectant fluid is shown at 26 in FIG. 1.

An air pressure tubes 28 leads from compressed air tank 16 toward fluid tanks 18, 18a. A swing valve 30 permits alternate supply of air to the selected one of branch conduits 32, 32a. Valve 30 may be equipped to have one operating position, whereby air is fed to both tanks 18, 18a simultaneously to operate both tanks at the same time. Branch conduits 32, 32a connect with respective tanks 18, 18a. As seen in FIG. 2, swing valve 30 is turned to provide a direct path from conduit 28 to conduit 32 and tank 18, while branch conduit 32a and tank 18a are cut off.

Conduit 28 includes an air supply shutoff valve 34 and a pressure regulator 36. Valve 34 allows the spraying mechanism to be connected to or disconnected from the air supply of the air brake system of vehicle 10. Air brake storage tank 16 usually has a pressure of around 165 p.s.i. of air, far in excess of that needed for spraying the disinfectant. Regulator 36 serves to reduce the initial pressure supplied to the spraying mechanism to a value of around 65 lbs. By this expedient, tanks 18, 18a and the associated spray mechanism conduits 32, 32a are not exposed to unduly high air pressures.

As an added safety measure, conduit 28 may also include a low-pressure cutoff valve 38 for preventing the air perssure in the high-pressure tank 16 against dropping below a predetermined minimum air pressure required for safe operation of the vehicle brake system. It will be understood that air brake tank 16 at all times contains far more air pressure than is required for spraying; hence there always is sufficient air pressure to operate the spray mechanism. Furthermore, the spray operation is normally used while truck 10 is at rest; hence, use of the spray mechanism normally cannot interfere with use of the air brake system. Even if the spray is used while truck 10 is in motion, the tank 16 at 165 p.s.i. has sufficient pressure for both purposes.

As best seen in FIG. 1, conduits 32, 32a feed into the tops of tanks 18, 18a. Safety relief valves 40, 40a may be provided on short extensions of respective conduits 32, 32a and are adjusted to open and release air pressure should this rise above, say, 70 p.s.i. Valves 40, 40a may be provided with a manually releasable closing member allowing one to reduce the air pressure in the respective tanks 18, 18a before unscrewing the caps 24, 24a thereof for refilling the tanks with the disinfectant. It will be understood that swing valve 30, prior to filling a tank, is set to disconnect the tank to be filled. Even while filling one tank, the other may be used for spraying.

Outlet tubes 42, 42a have a downwardly bent terminal portion within respective tanks 18, 18a, shown in FIG. 1 in broken lines, so as to reach into the fluid even when the fluid is at a low level. Flow valves 44, 44a are provided in respective lines 42, 42a. However, it will be understood that a single swing valve, similar to that shown at 30, could also be provided at the junction joint of tubes 42, 42a. From here, the fluid under pressure feeds into a rigid tubing 46 and a short section of flexible, preferably metal braided, tubing 48. Flexible tubing serves to absorb shock and vibration between the vehicle chassis and the body of the truck.

Tubing 48 feeds the liquid disinfectant to a junction 49 which feeds the spray to heavy duty conduits 50, 50a. Conduits 50, 50a lead to the opposite sides of truck 10. The ends of conduits 50, 50a connect with respective heavy duty flexible hose 51, 51a. Hose lines 50, 51 and 50a, 51a include shut-off valves 52, 52a. Valves 52, 52a are provided at accessible locations. The ends of hose 51, 51a have respective spray nozzles 54, 54a of the type allowing manual release upon depressing a spring-actuated valve. Spring clips 56, 56a or the like are attached to the rear sides of truck 10 for holding nozzles 54, 54a when not in use.

It will be noted that each tank 18, 18a is mounted on a respective side of truck 10 so as to maintain balance, particularly when filled with the disinfectant. Valves 52, 52a may prove useful when the associated hoses 50, 51 and 50a, 51a or nozzles 54, 54a need repairs or replacement.

In order to minimize the amount of time taken by the department of sanitation personnel during spraying operation, it may be visualized that after such person empties the garbage receptacle of its refuse, the sanitation personnel holds the receptacle with its opening facing nozzle 54 and leans on the nozzle trigger with his arm or shoulder to direct the spray into the receptacle. This will require mounting clips 56, 56a at any convenient location at the rear of the garbage truck so that the mounted nozzle may be pointed in the proper direction for aiming the spray into the empty receptacle held by the sanitation worker as he leans on the spray trigger with his arm or shoulder. As an alternative, the receptacle may be manually lifted until its rim strikes the nozzle trigger to activate same. FIG. 1 shows the receptacle 57 resting on the ground with its rim 58 striking the nozzle trigger so as to direct a spray into the receptacle. The foregoing example merely requires locating the nozzle clip 56 so when the receptacle 57 is held in a person's hand, the nozzle trigger is captivated by the receptacle rim 58 to spray the receptacle.

At regular intervals, the spraying mechanism may be use to cleanse the interior of the garbage truck itself, or any other object within reach of hose 51, 51a.

It is intended that all matter contained in the above description or shown in the accompanying drawing shall be interpreted as illustrative and not in a limiting sense.

What is claimed is:

1. A disinfectant spraying mechanism comprising a truck including an engine, a hydraulic air brake system operated by said engine and having a compressed air storage tank, a pair of tanks mounted on opposite sides of said truck for receiving disinfectant, conduit means connecting said tanks to said storage tank for expelling disinfectant from said tanks by the compressed air of said air brake system, said conduit means including valve means for selectively separately connecting one of said tanks to said storage tank, said conduit means further including pressure regulator means for limiting the pressure at said tanks to a predetermined pressure and low pressure cutoff valve means for preventing a drop of pressure in said storage tank below a predetermined value due to operation of said spraying mechanism so as to insure operation of said air brake system, outlet conduits secured to said truck extending transversely to opposite sides of said truck, outlet tube means including a section of flexible tubing connected between said outlet conduits and said tanks, hoses connected to said outlet conduits on opposite sides of said truck, and manually releasable nozzle means connected to said hoses for discharging disinfectant therethrough.

2. A mechanism according to claim 1 wherein said conduit means include relief valve means for preventing the pressure in said tanks to rise above a predetermined value and shutoff valve means for allowing repair and replacement of said hoses and said nozzle means.

References Cited by the Examiner

UNITED STATES PATENTS

| 1,725,581 | 8/1929 | Hendricks | 239—373 |
| 2,044,039 | 6/1936 | Woodcock | 239—373 |
| 2,424,468 | 7/1947 | Keathley | 239—373 |
| 2,780,491 | 2/1957 | Gauthier | 239—373 |
| 2,841,060 | 7/1958 | Coppage | 239—373 |

FOREIGN PATENTS

| 12,123 | 9/1928 | Australia. |
| 534,185 | 1/1922 | France. |

M. HENSON WOOD, JR., *Primary Examiner.*

EVERETT W. KIRBY, *Examiner.*